United States Patent
Little et al.

(10) Patent No.: US 10,156,071 B2
(45) Date of Patent: Dec. 18, 2018

(54) ADAPTOR FOR INSTALLING A CAMERA OR LIGHTING FIXTURE

(71) Applicant: Avigilon Corporation, Vancouver (CA)

(72) Inventors: Eric Little, Vancouver (CA); Nigel Geoffrey Taylor, Vancouver (CA)

(73) Assignee: Avigilon Corporation, Vancouver (CA)

(*) Notice: Subject to any disclaimer, the term of this patent is extended or adjusted under 35 U.S.C. 154(b) by 0 days.

(21) Appl. No.: 15/429,446

(22) Filed: Feb. 10, 2017

(65) Prior Publication Data
US 2018/0051463 A1  Feb. 22, 2018

Related U.S. Application Data

(60) Provisional application No. 62/377,183, filed on Aug. 19, 2016.

(51) Int. Cl.
| | | |
|---|---|---|
| E04B 9/00 | (2006.01) | |
| G03B 17/56 | (2006.01) | |
| F16M 13/02 | (2006.01) | |
| F21V 21/04 | (2006.01) | |

(52) U.S. Cl.
CPC ............ *E04B 9/006* (2013.01); *F16M 13/027* (2013.01); *F21V 21/045* (2013.01); *G03B 17/561* (2013.01)

(58) Field of Classification Search
USPC ....................................................... 248/544
See application file for complete search history.

(56) References Cited

U.S. PATENT DOCUMENTS

| | | | |
|---|---|---|---|
| 4,733,339 A | 3/1988 | Kelsall | |
| 4,739,460 A | 4/1988 | Kelsall | |
| 5,068,772 A | 11/1991 | Shapiro et al. | |
| 5,077,650 A | 12/1991 | Cestari | |
| 5,222,800 A | 6/1993 | Chan et al. | |
| 5,377,088 A | 12/1994 | Lecluze | |
| 5,609,414 A * | 3/1997 | Caluori | F21S 8/02 248/27.1 |
| 5,725,302 A | 3/1998 | Sirkin | |
| 5,941,625 A * | 8/1999 | Morand | F21S 8/02 248/343 |
| 6,554,458 B1 * | 4/2003 | Benghozi | F21V 21/04 362/147 |

(Continued)

FOREIGN PATENT DOCUMENTS

CA    2019834    12/1991

*Primary Examiner* — Clayton E Laballe
*Assistant Examiner* — Linda B Smith
(74) *Attorney, Agent, or Firm* — Daniel Hammond

(57) ABSTRACT

An adaptor for installing a camera or lighting fixture includes a housing. The housing includes a wall that define a slot that extends vertically between top and bottom ends of the slot. A spring steel strip is adapted to be received in the slot. The spring steel strip includes first and second sections separated by a sharp bend. A distal end of the first section is adapted to be brought into a first position in the slot. A distal end of the second section has a catch clip thereon adapted to be brought into a second position in the slot which is higher than the first position. The catch clip includes at least two resilient fingers adapted to permit the catch clip to be fitted into the slot when the two resilient fingers are laterally compressed towards each other, and then keep the distal end of the second section connected to the housing once the fingers are released.

17 Claims, 14 Drawing Sheets

(56) References Cited

U.S. PATENT DOCUMENTS

| | | | |
|---|---|---|---|
| 6,827,471 B1 | 12/2004 | Benghozi | |
| 7,513,658 B2 * | 4/2009 | Shen | F21V 21/04 |
| | | | 362/147 |
| 7,673,842 B2 * | 3/2010 | Nevers | F16F 1/025 |
| | | | 248/200 |
| 7,909,487 B1 | 3/2011 | Venetucci et al. | |
| 8,474,774 B2 * | 7/2013 | Svensson | F21S 8/02 |
| | | | 248/343 |
| 9,627,830 B1 * | 4/2017 | Wronski | H01R 33/08 |
| 2007/0008716 A1 | 1/2007 | Glickman | |
| 2007/0157353 A1 * | 7/2007 | Guney | A44B 11/266 |
| | | | 2/10 |
| 2009/0010007 A1 * | 1/2009 | Caluori | F21V 21/04 |
| | | | 362/366 |

* cited by examiner

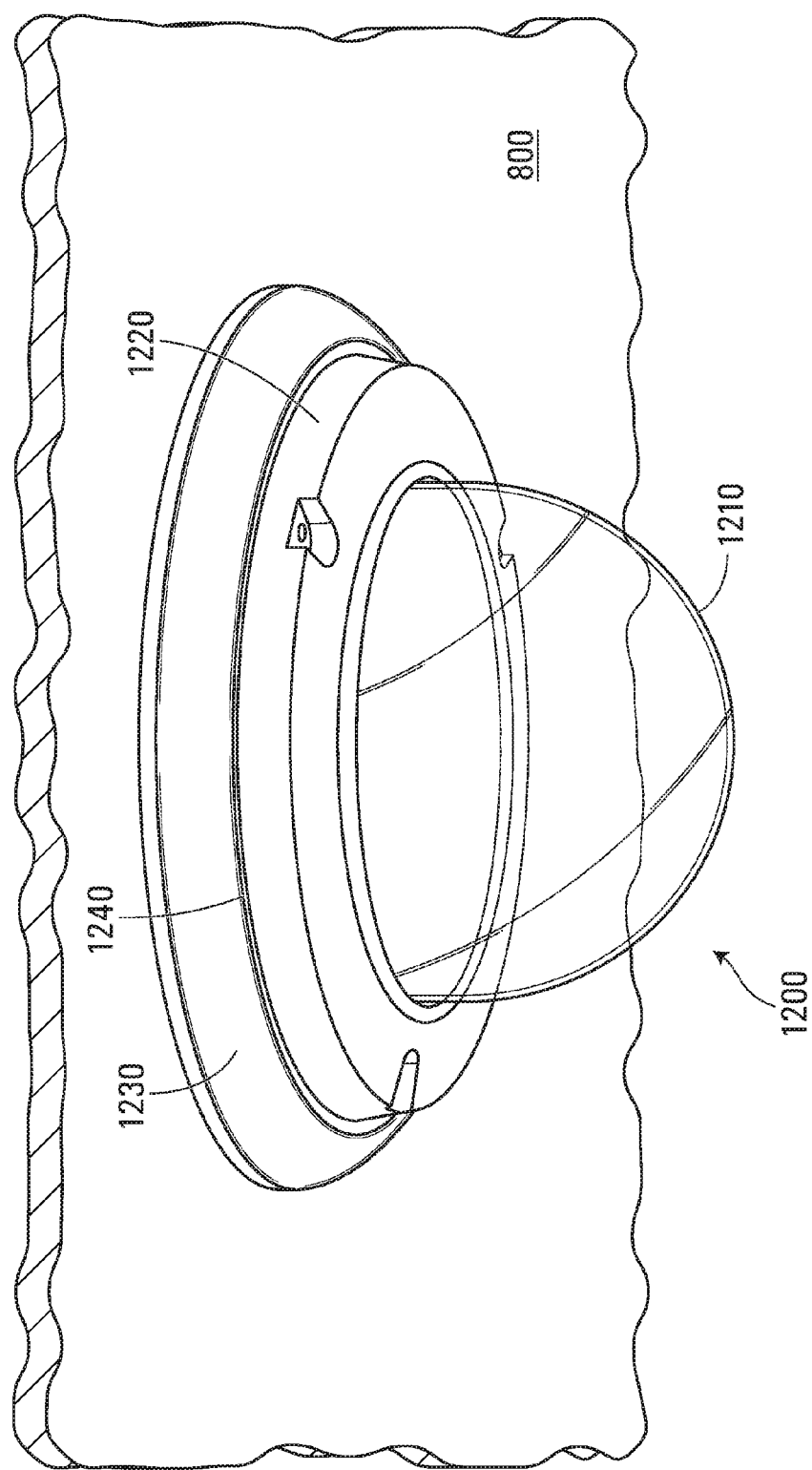

ADAPTOR FOR INSTALLING A CAMERA OR LIGHTING FIXTURE

RELATED U.S. APPLICATION DATA

The present application claims the benefit of priority of provisional application No. 62/377,183 filed on Aug. 19, 2016, the contents of which are hereby incorporated by reference in their entirety.

FIELD

The present subject-matter relates to apparatus for installing a camera or lighting fixture and, in particular, to an adaptor for installing a camera or lighting fixture.

BACKGROUND

In order to install a camera or lighting fixture onto a ceiling, an adaptor may be employed. Usually a circular hole is cut into a ceiling tile, where the hole is sized to receive the substantially cylindrical body of the adaptor which has a trim ring (or flange) at one end to abut a bottom surface of the ceiling tile. The diameter of the hole cut in the ceiling and the size of the adapter can vary depending on the size of the fixture. For example, some dome cameras may be "normal" sized, whereas other dome cameras may be made substantially smaller than normal. Normal sized dome cameras will be fitted into larger adaptors than those adaptors suitable for smaller sized dome cameras.

U.S. Pat. No. 7,513,658 entitled "Adjustable-Installed Recessed Lighting" is directed to the above described type of in-ceiling adaptor (i.e. that is received in the hole of a ceiling tile). The patent teaches providing leaf springs on the sides of a lighting housing which are manually pulled out from the sides and then these are pressed against the upper side of a ceiling panel. One disadvantage of the in-ceiling adaptor of U.S. Pat. No. 7,513,658 is that the leaf springs of the adaptor are not well designed to withstand being dislodged from the device during and after installation.

SUMMARY

According to one example embodiment, there is provided an adaptor kit that includes a housing. A wall defines a slot that extends vertically between top and bottom ends of the slot. A spring steel strip is adapted to be received in the slot, and the spring steel strip includes first and second sections. The first section including a surface configured to be pressed against a surface of a panel. The second section is curved in a longitudinal direction along at least a portion of a length of the second section. A distal end of the first section is adapted to be brought into a first position in the slot. A distal end of the second section has a catch clip thereon adapted to be brought into a second position in the slot which is higher than the first position. The catch clip includes at least two resilient fingers adapted to permit the catch clip to be fitted into the slot when the two fingers are laterally compressed towards each other, and then keep the distal end of the second section connected to the housing once the two fingers are released.

According to another example embodiment, there is provided an adaptor kit that includes a housing. A wall defines a slot that extends vertically between top and bottom ends of the slot. A spring steel strip is adapted to be received in the slot. The spring steel strip includes first and second sections separated by a sharp bend. A distal end of the first section is adapted to be brought into a first position in the slot. A distal end of the second section has a catch clip thereon adapted to be brought into a second position in the slot which is higher than the first position. The catch clip includes at least two resilient fingers adapted to permit the catch clip to be fitted into the slot when the two fingers are laterally compressed towards each other, and then keep the distal end of the second section connected to the housing once the two fingers are released.

According to yet another example embodiment, there is provided a fixture that includes a housing. A wall defines a slot that extends vertically between top and bottom ends of the slot. A spring steel strip is adapted to be received in the slot, and the spring steel strip includes first and second sections. The first section including a surface configured to be pressed against a surface of a panel. The second section is curved in a longitudinal direction along at least a portion of a length of the second section. A distal end of the first section is adapted to be brought into a first position in the slot. A distal end of the second section has a catch clip thereon adapted to be brought into a second position in the slot which is higher than the first position. The catch clip includes at least two resilient fingers adapted to permit the catch clip to be fitted into the slot when the two fingers are laterally compressed towards each other, and then keep the distal end of the second section connected to the housing once the two fingers are released. A camera is within a space defined by the housing and retained therein.

BRIEF DESCRIPTION OF THE DRAWINGS

Reference will now be made, by way of example, to the accompanying drawings:

FIGS. 15-16 illustrate bottom perspective views of examples of camera fixtures installed into adaptors in accordance with example embodiments.

Similar or the same reference numerals may have been used in different figures to denote similar example features illustrated in the drawings.

DETAILED DESCRIPTION OF EXAMPLE EMBODIMENTS

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

Adaptors are herein shown and described as capable of being attached onto a panel or tile of a ceiling; however example embodiments are not limited to use with ceilings. Adaptors in accordance with at least some example embodiments are also suitable for some non-ceiling applications such as, for example, walls having panels or tiles similar to those found in a ceiling.

Figure 1:
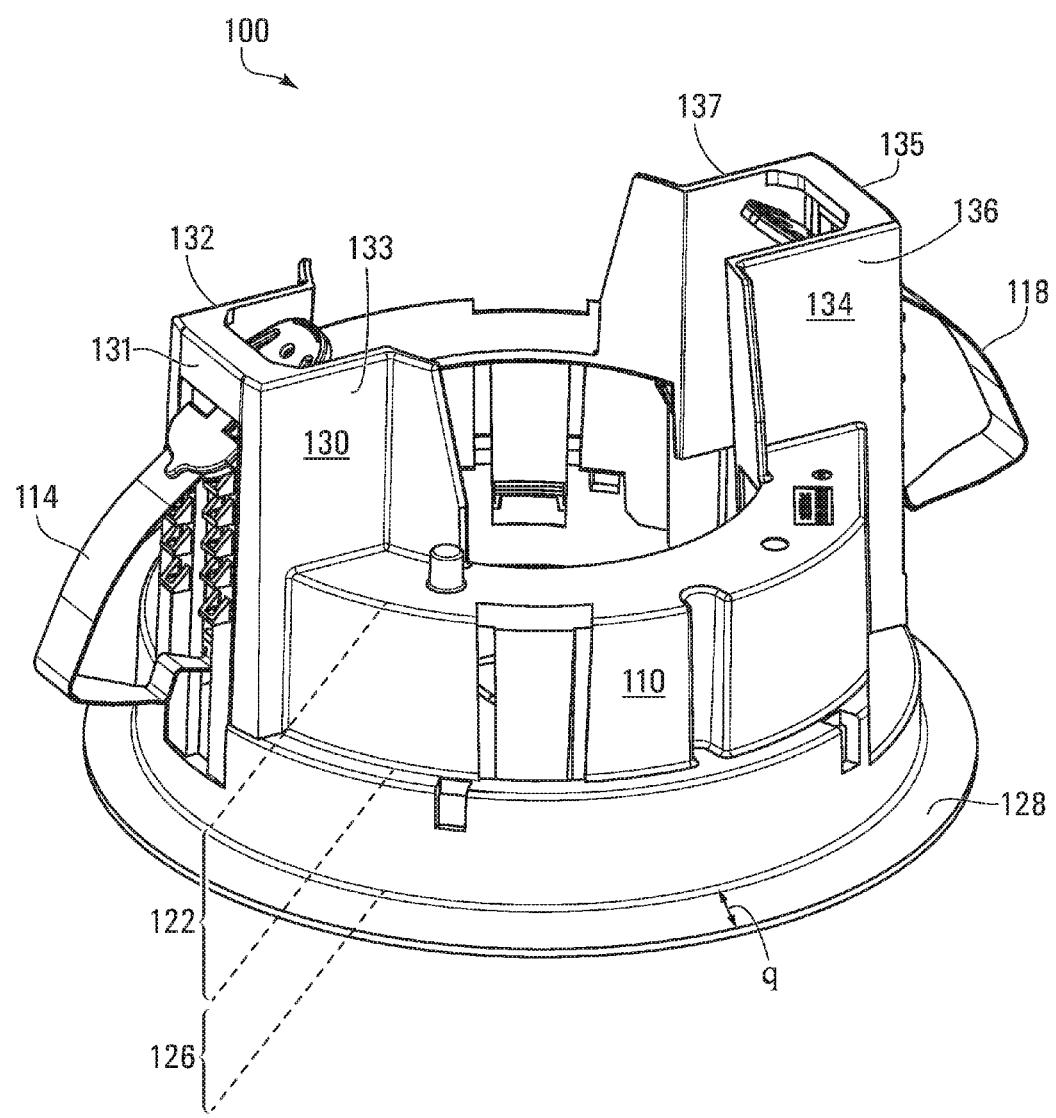
FIG. 1 illustrates a perspective view of an adaptor for installing a camera or lighting fixture in accordance with an example embodiment.

Reference is now made to FIG. 1, which illustrates a perspective view of an adaptor 100 for installing a camera or lighting fixture in accordance with an example embodiment. In the illustrated example embodiment, the adaptor 100 includes a recessed housing 110 and a pair of spring steel strips 114 and 118 attached on opposite sides (180 degrees spaced apart) of the recessed housing 110. Regarding the number of the spring steel strips, although the illustrated adaptor 100 accommodates two, any suitable number is possible in alternative example embodiments including, for example, three where each may be 120 degrees spaced apart once each are inserted into their respective slot, four where each may be 90 degrees spaced apart once each are inserted into their respective slot, etc.

The housing 110, which in one example is made of plastic, includes an upper section 122 and a lower section 126. Both the upper section 122 and the lower section 126 are roughly cylindrical in overall shape. The upper section 122 has a narrower circumference than the lower section 126. Although size measurements will vary depending on various factors, in one example the lower section 126 can have a diameter of 148 mm (as measured along a line at the bottom of the section) and the upper section 122 can have a diameter of 134 mm (also as measured along a line at the bottom of the section). The wider diameter and circumference of the lower section 126 enables a tighter fit against the ceiling tile as explained subsequently. At the bottom of the adaptor 100 is a trim ring (flange) 128. The trim ring 128 abuts (or is at least positioned closely adjacent) a bottom surface of a ceiling panel or tile as will be shown and described in more detail subsequently. In one example, distance q between the outer edge of trim ring 128 to where the trim ring 128 meets the sidewall of the lower section 126 is 13 mm.

Figure 2:
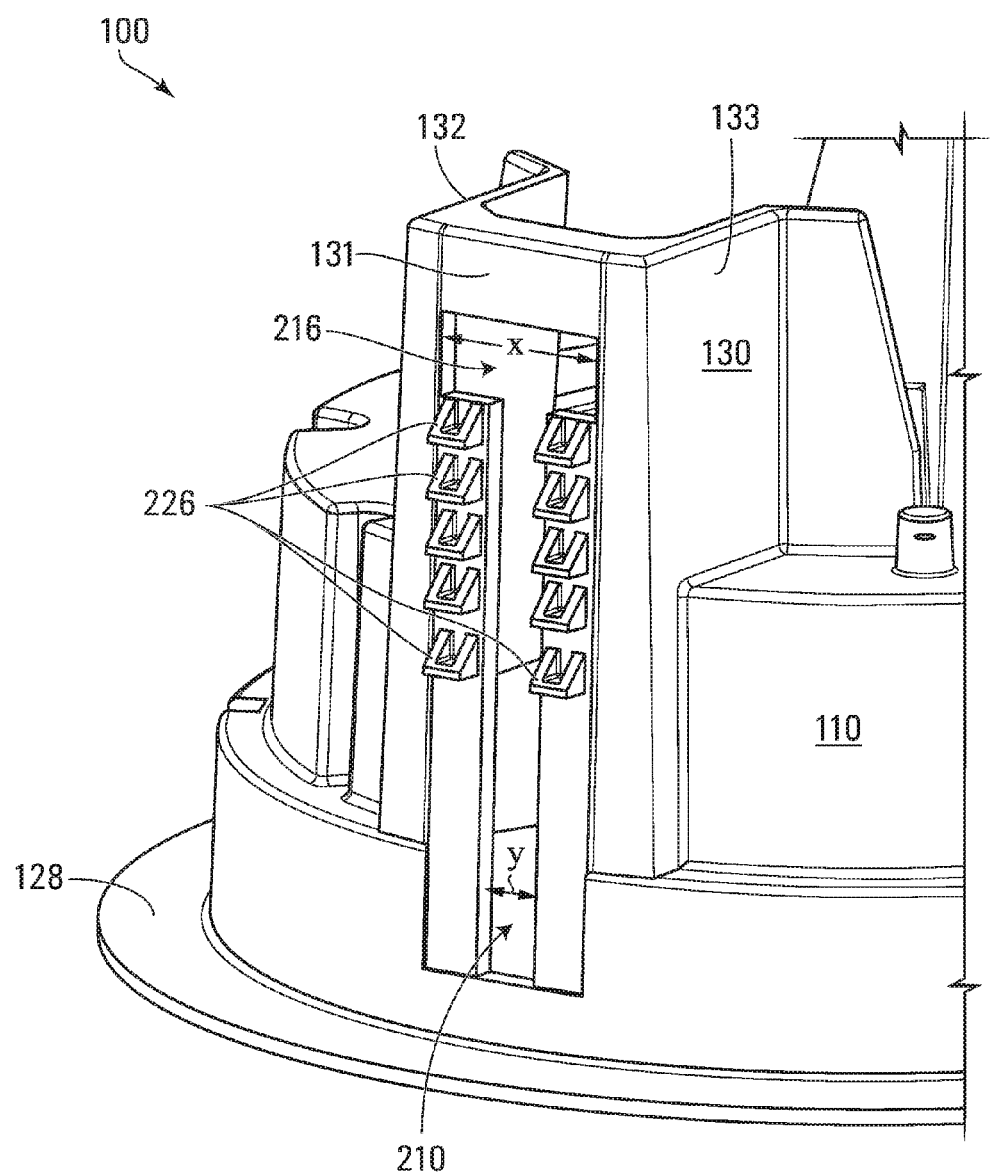
FIG. 2 illustrates another perspective view of the adaptor, except only part of the adaptor is shown and also spring steel strips are shown removed to more clearly illustrate one of two spring steel strip receiving slots.

On opposite (diametrically opposed) sides of the housing 110 are columns 130 and 134. The column 130 has walls 131, 132 and 133. The column 134 has walls 135, 136 and 137. Each of the columns 130 and 134 defines a spring receiving slot. FIG. 2 illustrates a spring receiving slot 210 of the column 130 defined in the wall 131 (the wall 131 extends between the perpendicularly extending sidewalls 132 and 133). The spring receiving slot 210 is "T" shaped. Thus slot width (labelled x) at an end 216 of the spring receiving slot 210 (and above plurality of ratchet teeth 226) is wider than a slot width (labelled y) at other positions along a vertical length of the spring receiving slot 210. It should be noted that, in some examples, the widened part of the slot may be provided at a different location. For instance, if the adaptor had less ratchet teeth at a lower positions and/or the spring steel strip had a different shape, the widened part of the slot could be provided below the ratchet teeth. Although size measurements will vary depending on various factors, in one example the widths x and y can be 21.5 mm and 8.0 mm respectively. Starting just below the wide end 216 of the spring receiving slot 210 are the plurality of ratchet teeth 226 arranged along the vertically extending sides of the slot 210. As will be subsequently explained in more detail, the ratchet teeth 226 serve to fix an end of the spring steel strip 114 into the slot 210 at any one of variable positions (five possible positions in the illustrated example; however few or additional ratchet teeth would translate into less or more positions respectively). Although size measurements will vary depending on various factors, in one example the ratchet teeth 226 have side surfaces (i.e. surfaces perpendicular to the wall 131) having an almost right angled triangle shape (in some examples the angle may be for example anywhere from 85.0° to 95.0°) and where the shorter sides are each roughly 4 mm in length, and in this same example the distance between the two side surfaces can be 5 mm. The variable clamping positions facilitate clamping on ceiling panels of different thicknesses. In one example the adaptor 100 is compatible with clamping ceiling panels having a thickness anywhere between 2 mm and 32 mm. It will be appreciate that thicknesses of ceiling panels and tiles do indeed vary. For example, a typical thickness of ceiling drywall may be, for instance, about 13 mm. As another example, typical thicknesses of ceiling tiles may be, for instance, anywhere between about 25 mm and 32 mm. As yet another example, a metal panel could be as thin as 2 mm.

Figure 3:
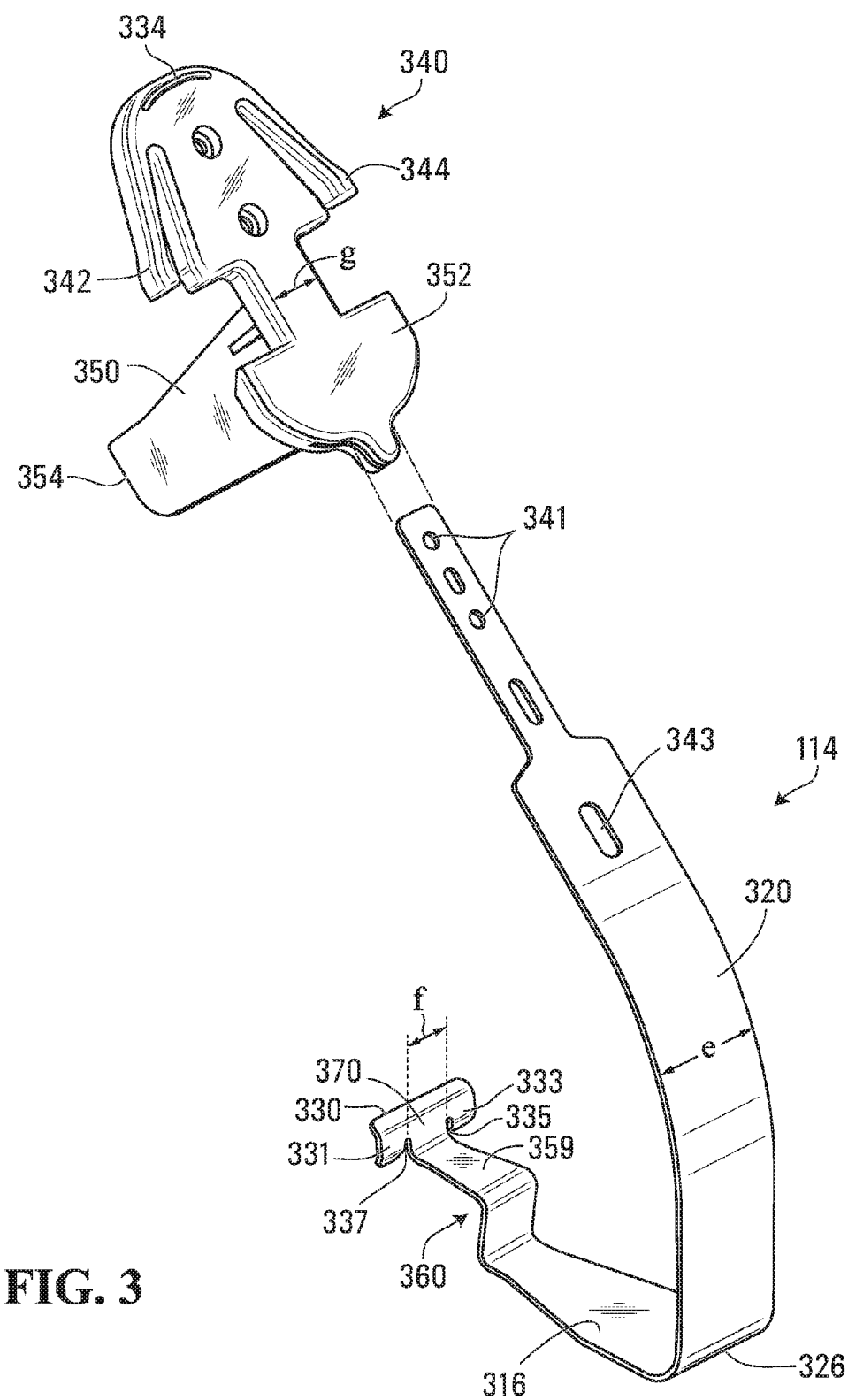
FIGS. 3 and 4 illustrate perspective views, exploded and non-exploded respectively, of one of the two spring steel strips included in the adaptor of FIG. 1.
Figure 4:
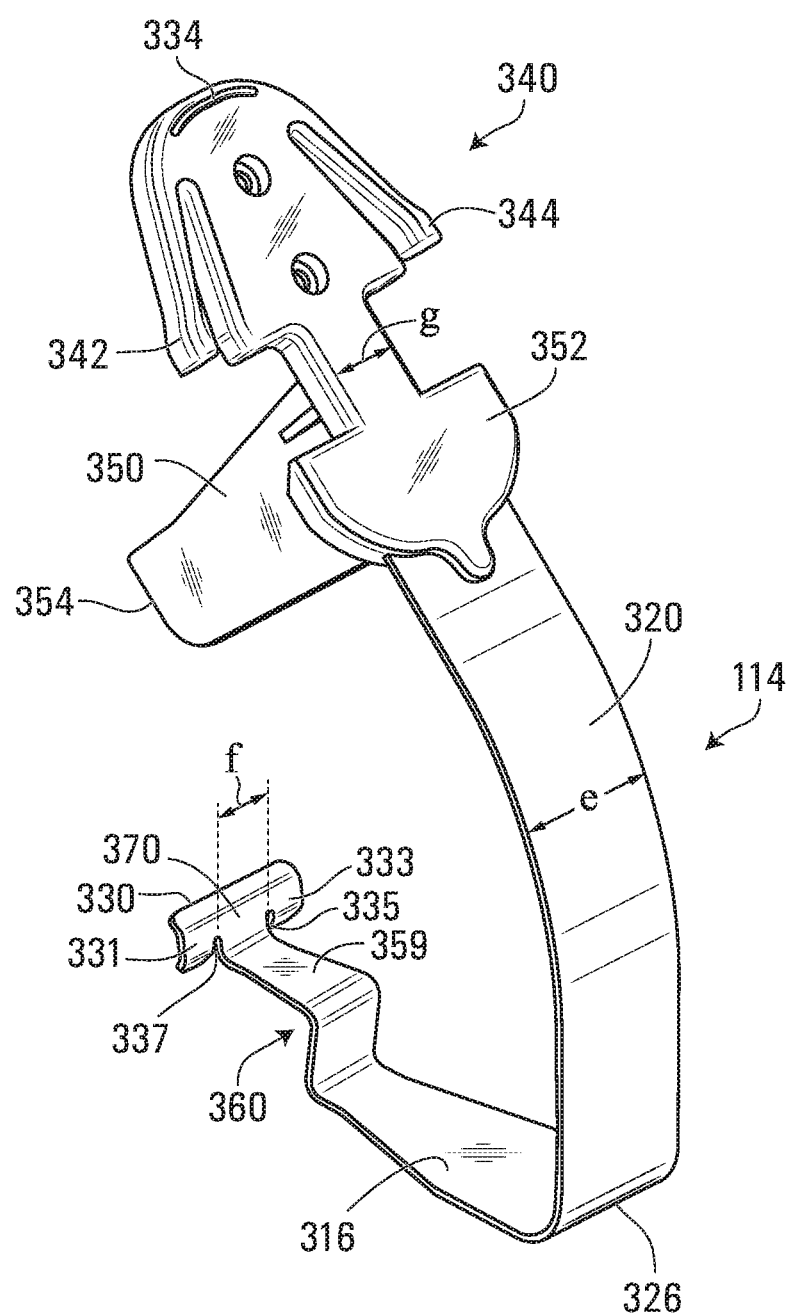

Reference will now be made to FIGS. 3 and 4 which illustrate the spring steel strip 114 in greater detail (it will be noted that spring steel strip 118 can be constructed identical to the spring steel strip 114, so the description below applies equally to the spring steel strip 118).

The spring steel strip 114 includes a first section 316 and a second section 320. The first section 316 and a second section 320 are separated by a sharp bend 326. A distal end 330 of the first section 316 is adapted to be fitted into a low position in the slot 210. As shown in FIG. 3, the width of the spring steel gradually tapers from the sharp bend 326 to the distal end 330. This gradual tapering helps to reduce the stress on the spring steel strip 118 at reductions in width. The first section 316 is also bent twice at roughly 90 degrees angles at region 360 which, in the illustrated example, is about two thirds of the distance from the sharp bend 326 to the distal end 330. The two bends facilitate clamping for those panels at the low end of the range of panel thickness. There is also a flange at the distal end 330. Measured from flange side end 331 to opposite flange side end 333, the flange is substantially wider as compared to the width at an adjacent region of the first section 316 (in one example the former and latter are 12.7 mm and 5.0 mm respectively. In some examples, the flange width is greater than the width of the slot 210 at the low slot position and the width of the slot 210 at the low slot position is greater than the width in the flange-adjacent region of the first section 316. Two notches 337 and 335 are formed where the flange meets the adjacent region of the first section 316. Also, a surface 370 of the flange is curved (convex curvature). Also, it will be understood that the illustrated shape and design of the flange at the distal end 330 facilitates non-catching of metal edges on the inside of the plastic adaptor. It should be noted that other shapes and designs for the part of the strip located at the distal end 330 are contemplated as well.

Whereas the distal end 330 of the first section 316 is adapted to be fitted into a low position in the slot 210, a distal end 334 of the second section 320 having a catch clip 340 thereon is adapted to be fitted into a high position in the slot 210. Also, regarding fitting the distal ends 330 and 334 into the slot 210, the distal end 330 should be fitted in first before the distal end 334.

The catch clip 340 is an over mold on the spring steel strip 114. As will be understood by those skilled in the art, over molding can be a process whereby two materials are permanently fixed together. In the context of the spring steel strips herein disclosed, the catch clip 340 is injection molded onto the steel strip. Plastic flows through small circular holes 341 in the metal to hold the pieces together. Regarding hole 343, it is at the interface between plastic and steel. The placement of the hole 343 at the illustrated position facilitates reduction of stress on the plastic when the spring steel strip 114 is loaded. In summary, over molding catch clip 340 onto the steel strip results in the catch clip 340 being permanently fixed thereto and the catch clip 340, once over molded, will not slip off of the steel strip.

The catch clip 340 includes two fingers 342 and 344 adapted to permit the catch clip 340 to be fitted into the slot 210 when the two fingers 342 and 344 are laterally compressed towards each other and the catch clip is pushed through the slot 210 at the wide end 216. The two fingers 342 and 344 also serve to keep the distal end 334 of the second section 320 connected to the housing 110 once the two fingers 342 and 344 are released (i.e. the overall width of the catch clip 340 expands to become greater than the width x described previously).

Figure 14:
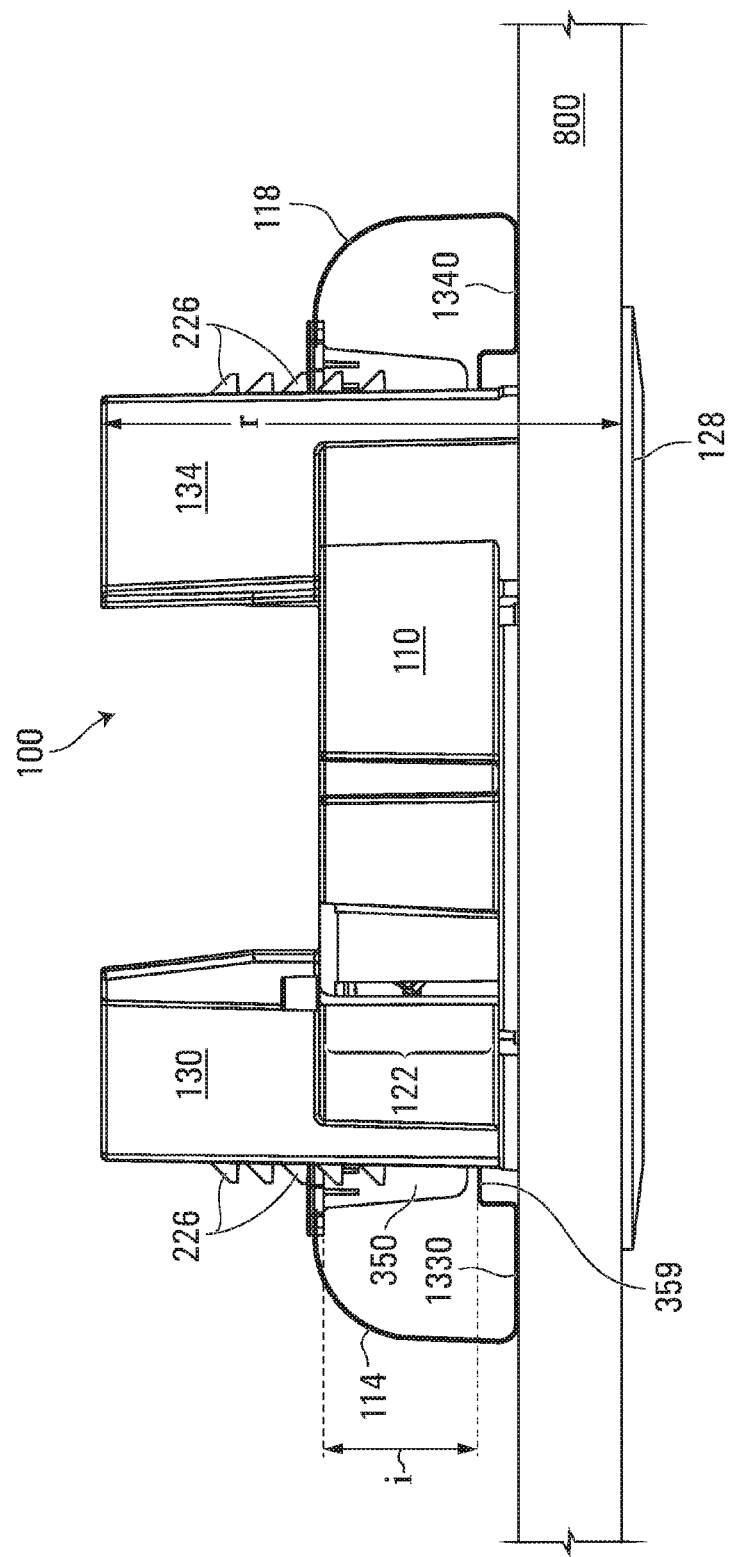
FIG. 14 illustrates a side elevational view of the adaptor of FIG. 1 after attachment onto the ceiling.

The catch clip 340 includes a stopper 350 which extends in a downward and perpendicular direction relative to a top surface 352 of the catch clip 340. The stopper 350 may help to prevent over compression of the spring steel strip 114. In particular, as the ends 330 and 334 are adjusted within the slot 210 in completing an in-ceiling installation, those ends will be brought closer together (as shown in FIG. 14 that will be described later) and a bottom 354 of the stopper 350 will abut against a surface 359 of the first section 316. Thus the stopper 350 will physically act against the ends 330 and 334 being compressed even further towards each other. The stopper 350 will be later herein shown and described in more detail.

Although size measurements will vary depending on various factors, in one example width e of the second section 320 can be 12.7 mm, width f at the narrowest point of the first section 316 can be 5.0 mm, and width g at the slot-engaging part of the catch clip 340 can be 7.0 mm. Also, in the same example the width between outermost edges of the fingers 342 and 344 can be 26.0 mm.

Figure 5:
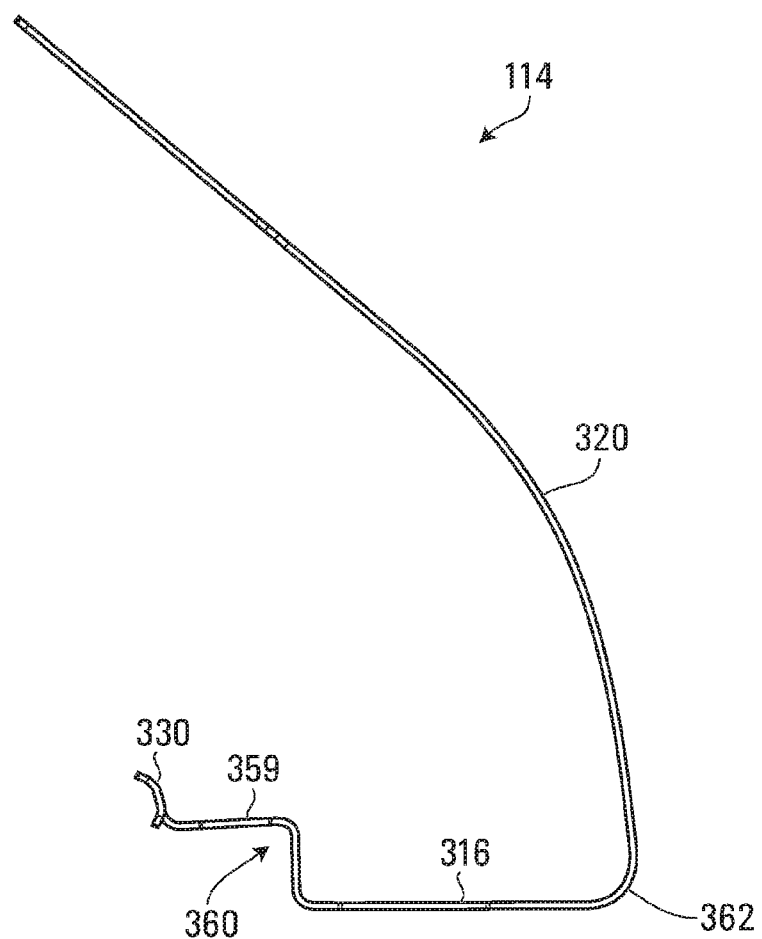
FIG. 5 illustrates a side elevational view of the spring steel strip without a catch clip over molded onto it.
Figure 6:
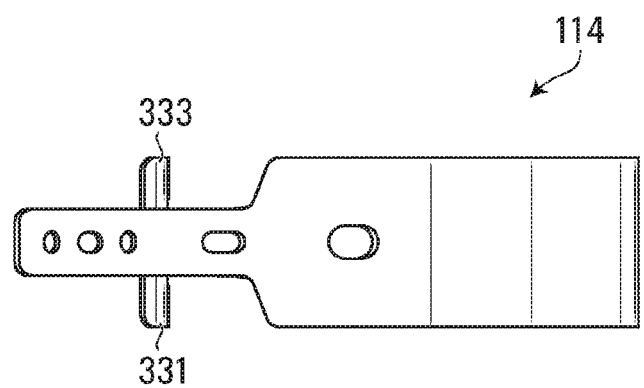
FIG. 6 illustrates a top view of the spring steel strip of FIG. 5.
Figure 7:
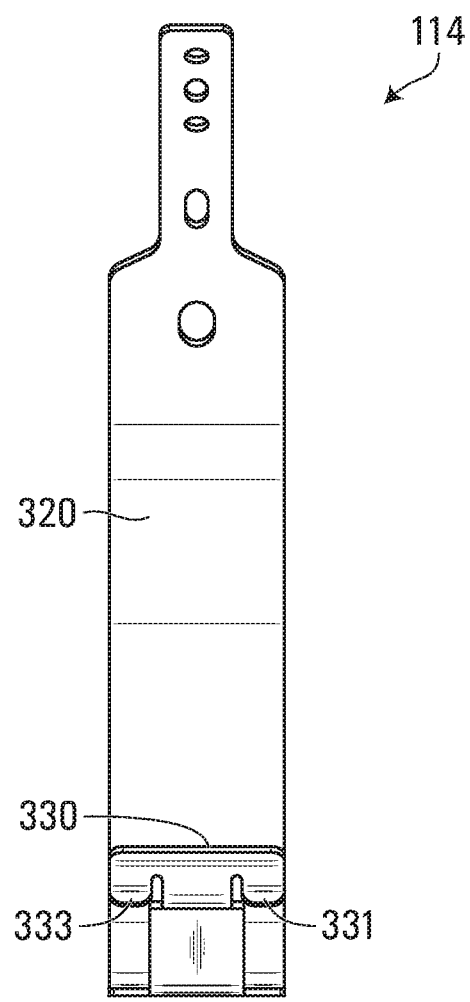
FIG. 7 illustrates an end elevational view of the spring steel strip of FIG. 5.

FIG. 5 illustrates a side elevational view of the spring steel strip 114 without the catch clip 340 over molded onto it. FIG. 6 illustrates a top view of the spring steel strip 114. FIG. 7 illustrates an end elevational view of the spring steel strip of 114. (It is noted again that spring steel strip 118 can be constructed identical to the spring steel strip 114, so FIGS. 5-7 referenced above and FIGS. 8-9 referenced below, serve equally well to illustrate the spring steel strip 118.)

Figure 8:
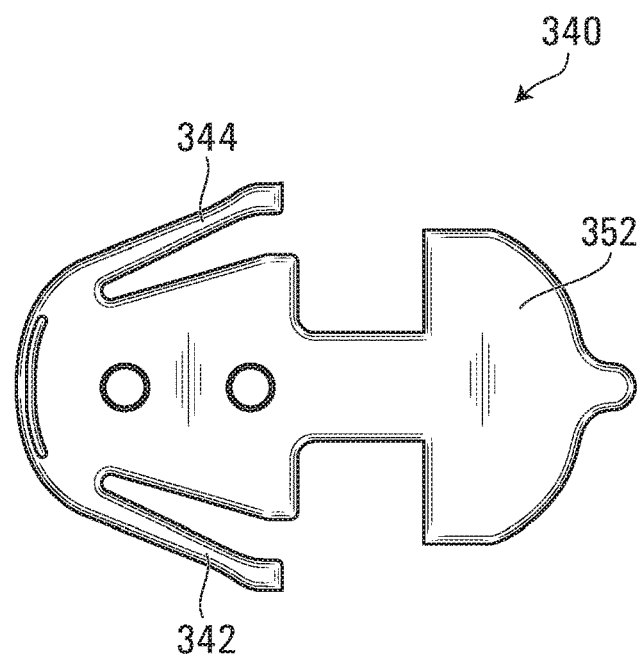
FIG. 8 illustrates a top view of a catch clip that forms a part of the spring steel strip of FIG. 3.
Figure 9:
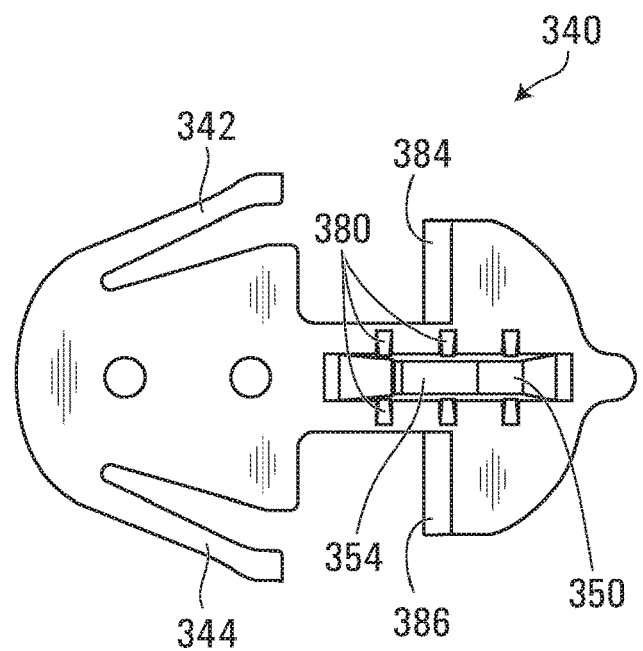
FIG. 9 illustrates a bottom view of the catch clip of FIG. 8.

Continuing on, FIG. 8 illustrates a top view of the catch clip 340 that forms a part of the spring steel strip 114. FIG. 9 illustrates a bottom view of the catch clip 340. As can be seen in this figure, a plurality of ridges 380 are formed on both sides of the stopper 350. The ridges 380 serve a structural purpose to reduce a likelihood of cracked plastic. Also, edges 384 and 386 are at an acute angle relative to the top surface 352 of the catch clip 340. This facilitates engagement with the ratchet teeth 226 (FIG. 2).

Figure 10:
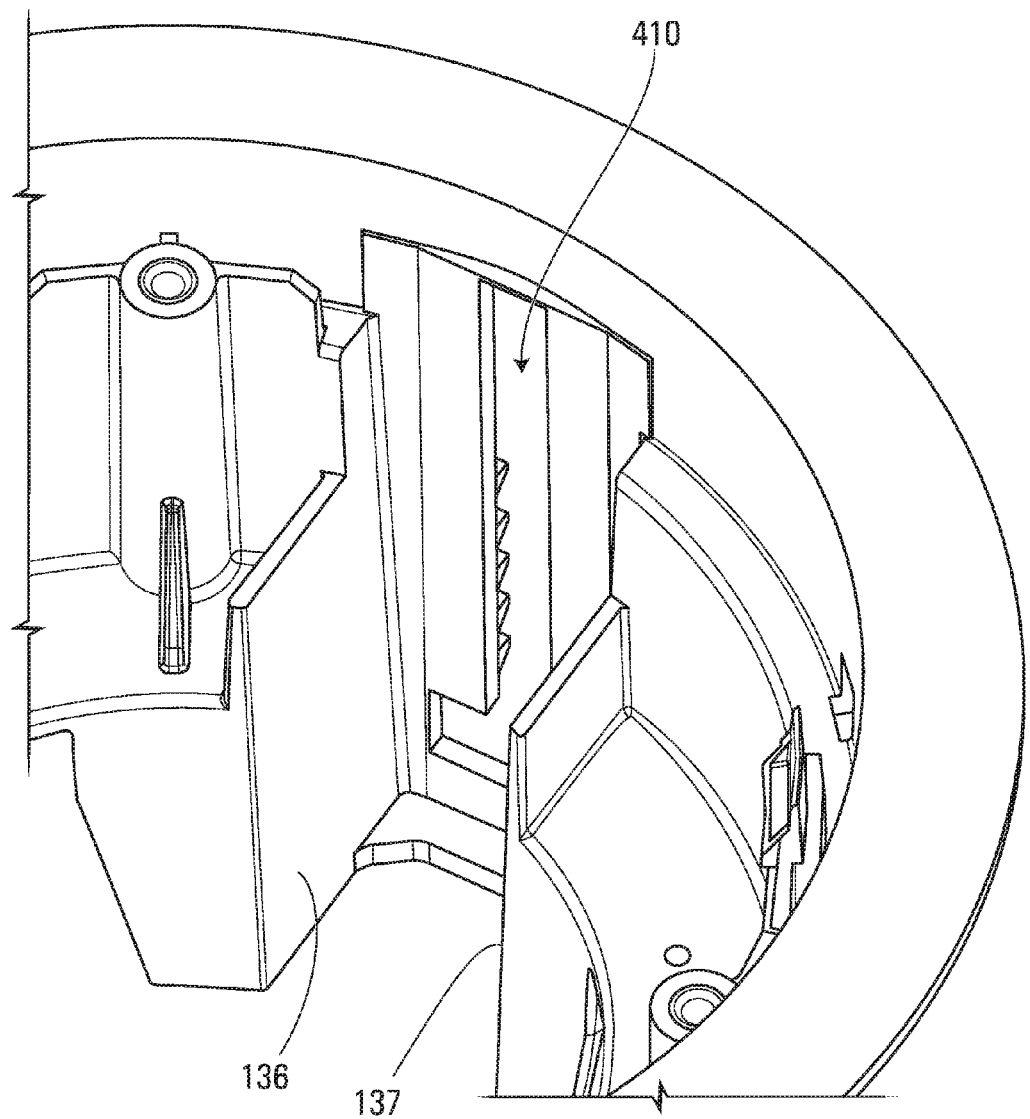
FIG. 10 illustrates a partial bottom view of the adaptor of FIG. 1.

Reference will now be made to FIG. 10 which illustrates a partial bottom view of the adaptor 100. In this figure the reference numeral 410 indicates the strip receiving slot (as seen from the opposite side as compared to FIG. 2). It will be understood that the metal strip 118 would normally extend through the strip receiving slot upon full assembly of the adaptor 100; however the metal strip 118 is not shown in FIG. 5 in order that the walls 136 and 137 of the column 134 may be more clearly shown. Regarding the walls 136 and 137, these can be dimensioned sufficiently large so that they serve to restrict bumping and contact of the catch clip 340 with cables or wires that will be installed within the housing 100. Specifically cables or wires may be more prone to contact issues with the fingers 342 and 344 of the catch clip 340 than other parts of the catch clip 340 due to their specific shape and location on the catch clip 340. In one example the length and height of each of the walls 136 and 137 can be 28 mm and 58 mm respectively.

Figure 11:
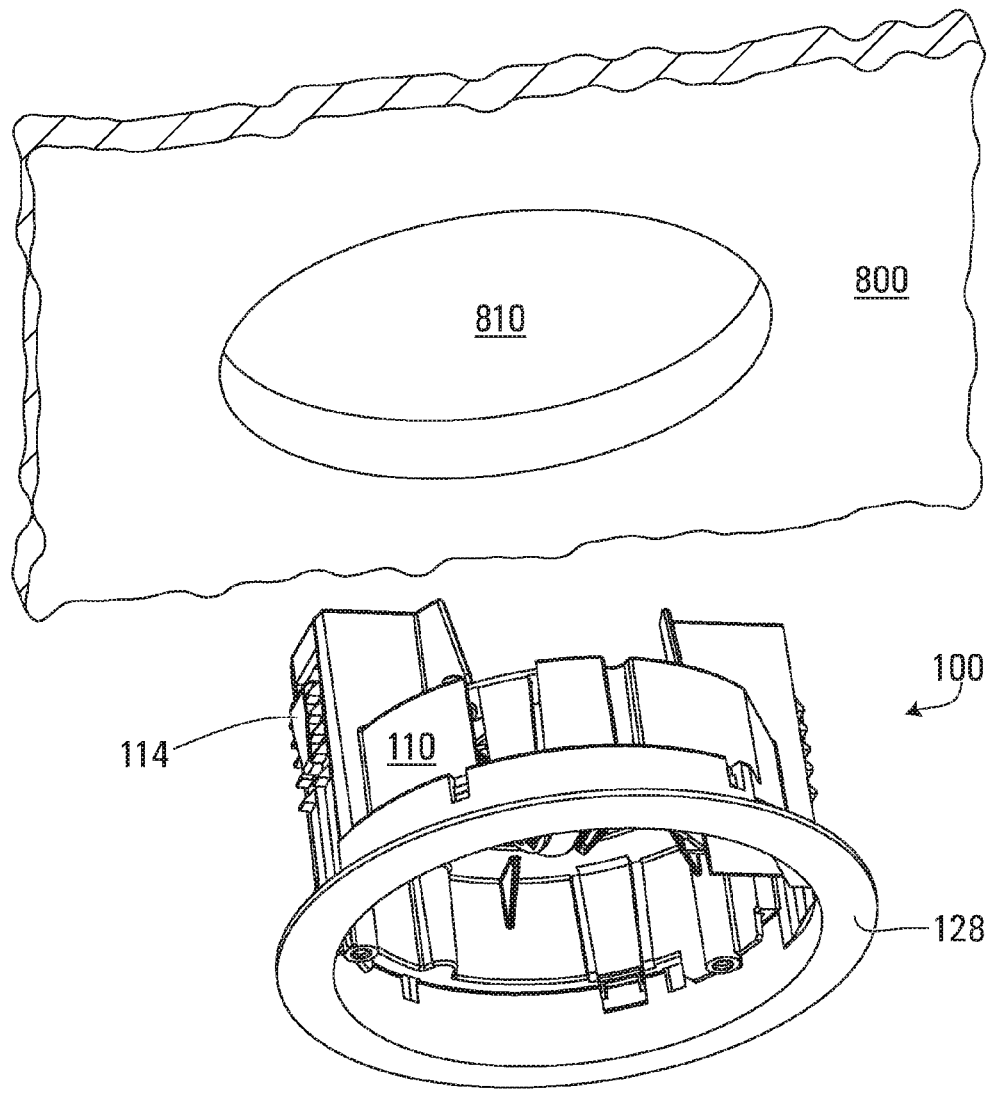
FIG. 11 illustrates a bottom perspective view of the adaptor of FIG. 1 prior to attachment onto a ceiling.
Figure 12:
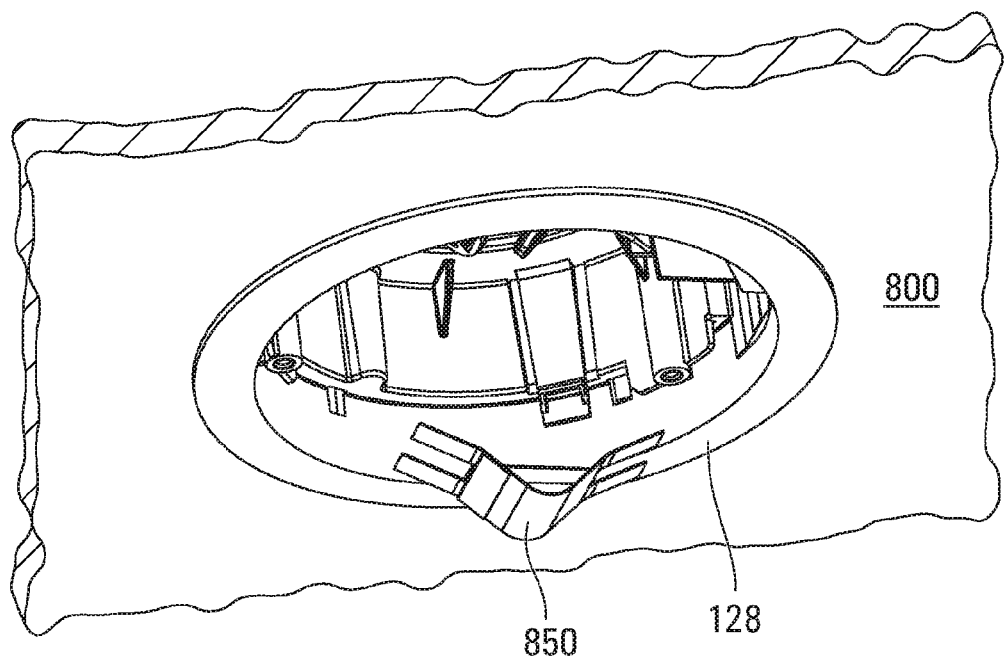
FIG. 12 illustrates a bottom perspective view of the adaptor of FIG. 1 after positioning for attachment onto the ceiling.

Reference will now be made to FIGS. 11 and 12 which illustrate attachment of the adaptor 100 onto a ceiling panel or tile 800. First, a round hole 810 is cut into the ceiling panel 800. The size of the hole will vary depending on the size of the adaptor. In one example where the diameter of the adaptor is 17.4 cms as measured from outer edge-to-outer edge of the trim ring 128, the diameter of the hole 810 can be 15.5 cms. It is noted that in the illustrated example the steel spring strip 114 is pulled in before the adaptor 100 is inserted into the hole 810 (the steel spring strip 118 is similarly pulled in even though it cannot be seen in FIG. 11). Keeping the steel spring strips 114 and 118 from protruding out the sides of the adaptor 100 ensures that the adaptor 100 will snugly fit into the hole 810 without any interference as between circular ceiling panel edge that defines the hole and either of the steel spring strips 114 and 118. One way to keep the steel spring strips 114 and 118 pulled in is to connect the catch clips of each of the strips together using a piece of cardboard provided with slots to receive the catch clips and keep them retained thereon (it will be noted that, with respect to FIG. 11, the piece of cardboard is on the inside of the housing 110 and obscured from view). Those skilled in the art will appreciate that alternatives to using a piece of cardboard to keep the steel spring strips 114 and 118 pulled in are contemplated. For example, a piece of tape attached between the two catch clips can achieve a similar function.

FIG. 12 illustrates the adaptor 100 after being snugly fit into the hole 810. As can be seen in this figure, once the adaptor 100 is put into the correct position relative to the ceiling panel or tile 800, the hole 810 is no longer visible and the trim ring 128 abuts (or is at least positioned closely adjacent) a bottom surface of a ceiling panel or tile 800. It should also be noted that when the adaptor 100 is in position as illustrated, the steel spring strips 114 and 118 have cleared the hole 810 so cardboard 850 for keeping the catch clips together is removed and the steel spring strips 114 and 118 moved into a ready to use position as illustrated in FIG. 13.

Figure 13:
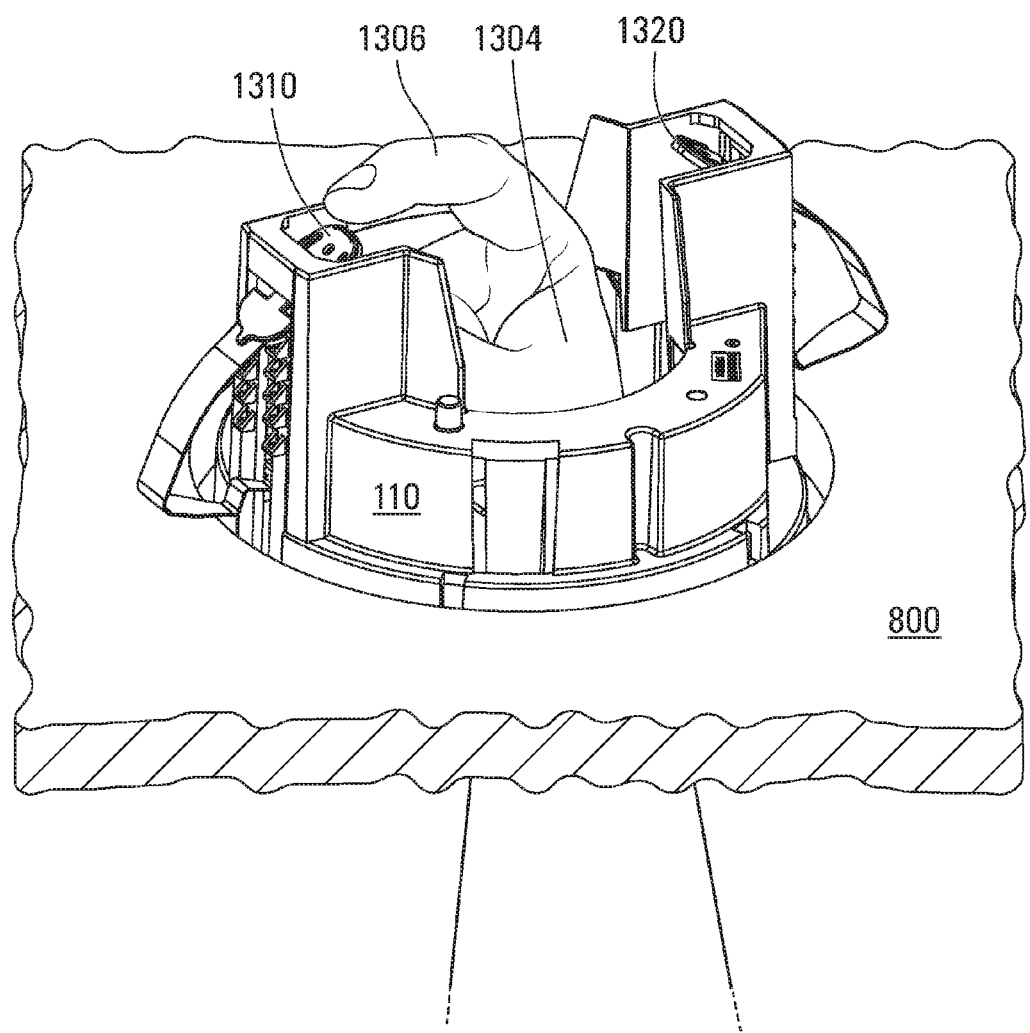
FIG. 13 illustrates a top perspective view of the adaptor of FIG. 1 after positioning for attachment onto the ceiling.

As shown in FIG. 13, a hand 1304 is raised through the ceiling panel 800 via a central open portion of the housing 110, and a finger 1306 of the hand 1304 can then press on both catch clip 1310 and catch clip 1320. After the catch clips 1310 and 1320 have been pressed down to a suitable one of the plurality of positions as defined by the ratchet teeth 226, sections 1330 and 1340 of the steel spring strips 114 and 118 respectively press down on the ceiling panel 800 as shown in FIG. 14.

Thus FIG. 14 illustrates the adaptor 100 in an installed position with the steel spring strips 114 and 118 exerting clamping force down on a top surface of the ceiling panel 800. Although size measurements will vary depending on various factors, in one example the vertical length i from a top of the stopper 350 to the surface 359 can be 28 mm. Also, the vertical length r from the point where the trim ring 128 contacts the ceiling panel 800 to the top of the column 134 can be 96 mm.

After the adaptor 100 is installed, a camera or lighting fixture can then be installed. Those skilled in the art will have knowledge of how to install the camera or lighting fixture once the adaptor is in place, and in event the specific details of such will vary depending on the construction of the adaptor.

Figure 15:
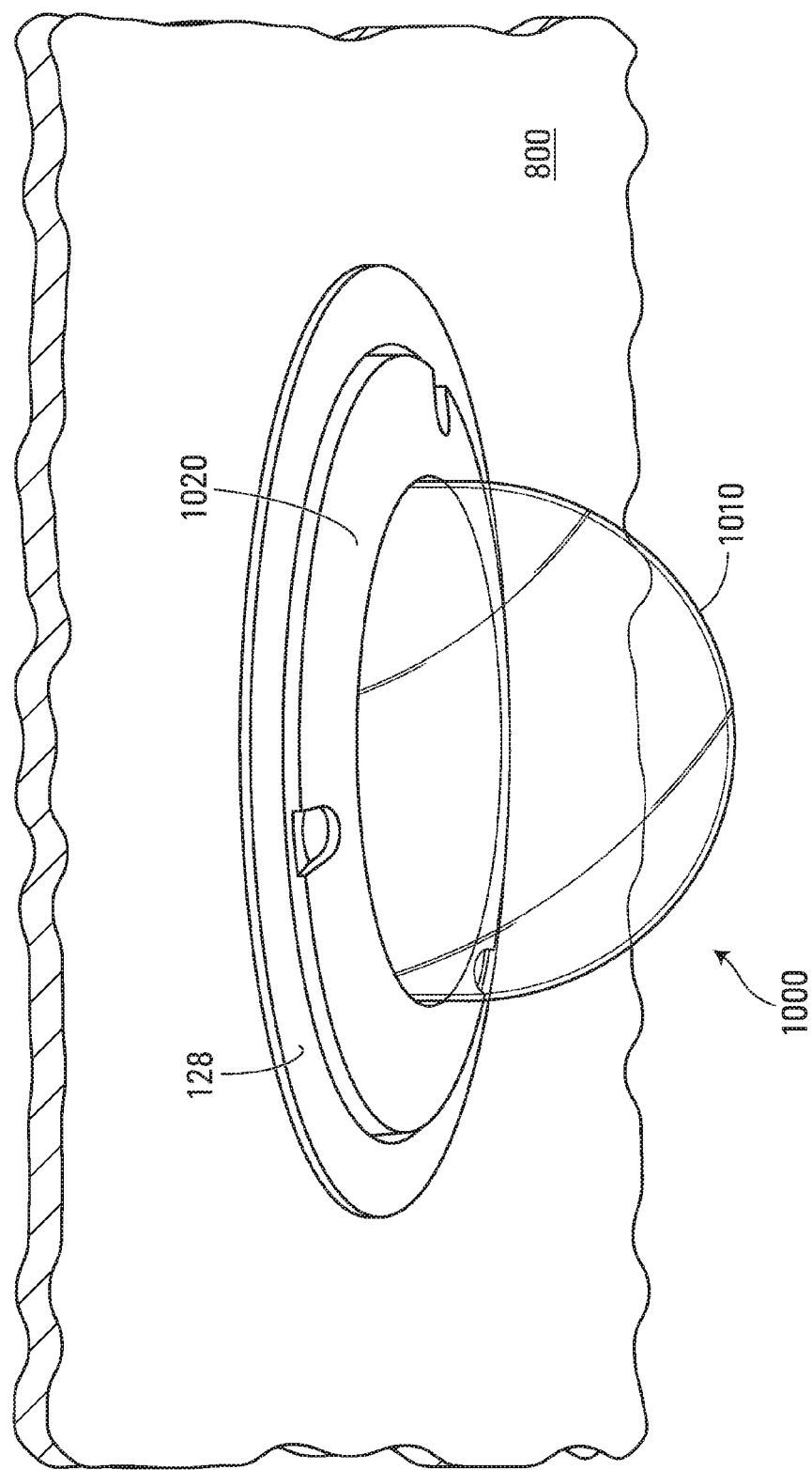

FIG. 15 illustrates a camera fixture 1000 after installation into the adaptor 100. Since the adaptor 100 is recessed into the ceiling, only the trim ring 128 of the adaptor 100 is visible from the view of someone looking up at the ceiling. The camera fixture 1000 includes a dome 1010. Since the dome 1010 is typically transparent or translucent, a camera inside the dome 1010 would normally be visible; however the camera has been omitted from FIG. 15 for convenience of illustration. The camera fixture 1000 also includes a bezel 1020 at an interface between the trim ring 128 and the dome 1010.

Other configurations and variations are contemplated, one example of which is shown in FIG. 16. FIG. 16 illustrates another example camera fixture 1200. In FIG. 16 camera fixture 1200 has a dome 1210 similar to the dome 1010 shown in FIG. 15; however bezel 1220 extends beyond (below) the ceiling panel 800. Also, trim ring 1230 of the adaptor is different than the trim ring 128 shown in FIG. 15. The trim ring 1230 has a rounded exterior surface and this results in a circular transition line 1240 between the trim ring 1230 and the bezel 1220 to be lower relative to the ceiling panel 800.

Certain adaptations and modifications of the described embodiments can be made. For example, the adaptor 100 herein illustrated and described is customized for a camera such as, for example, a dome camera. It will be understood that use of the adaptor in accordance with example embodiments is not limited to camera fixtures. For instance, with suitable customization an adaptor in accordance with some example embodiments can be used for attaching a lighting fixture to a ceiling panel (the customization in such a case may include, for example, reducing dimensions of the adaptor since a lighting fixture could be smaller than a typical camera fixture).

Therefore, the above discussed embodiments are considered to be illustrative and not restrictive, and the invention should be construed as limited only by the appended claims.

The invention claimed is:

1. An adaptor kit comprising:
a housing including a wall defining a slot extending vertically between top and bottom ends of the slot; and
a spring steel strip adapted to be received in the slot, the spring steel strip including first and second sections, the first section including a surface configured to be pressed against a surface of a panel and the second section being curved in a longitudinal direction along at least a portion of a length of the second section, a distal end of the first section adapted to be brought into a first position in the slot, and a distal end of the second section having a catch clip thereon adapted to be brought into a second position in the slot which is higher than the first position, the catch clip including at least two resilient fingers adapted to permit the catch clip to be fitted into the slot when the two fingers are laterally compressed towards each other, and then keep the catch clip moveably connected to the housing and within the slot once the two fingers are released.

2. The adaptor kit of claim 1 further comprising a second spring steel strip, and
wherein the slot, the spring steel strip and the wall are a first slot, a first spring steel strip and a first wall respectively, and the housing further includes a second wall defining a second slot extending vertically between top and bottom ends of the second slot, and the second spring steel strip is adapted to be received in the second slot, the first section of the second spring steel strip including a surface configured to be pressed against a surface of the panel and the second section of the second spring steel strip being curved in a longitudinal direction along at least a portion of a length of the second section of the second spring steel strip, a distal end of the first section of the second spring steel strip being adapted to be brought into a first position in the second slot, and a distal end of the second section of the second spring steel strip having a catch clip thereon adapted to be brought into a second position in the second slot which is higher than the first position in the second slot, and the catch clip of the second spring steel strip including at least two resilient fingers adapted to permit the catch clip of the of the second spring steel strip to be fitted into the second slot when the two fingers of the catch clip of the second spring steel strip are laterally compressed towards each other, and then keep the distal end of the second section of the second spring steel strip connected to the housing once the two fingers of the catch clip of the second spring steel strip are released.

3. The adaptor kit of claim 1 wherein the housing further includes ratchet teeth, and the ratchet teeth are configured to engage the catch clip and fix the distal end of the second section at the second position.

4. The adaptor kit of claim 1 wherein the catch clip includes a stopper configured to limit the extent to which the distal end of the first section can be brought close to the distal end of the second section.

5. The adaptor kit of claim 2 wherein the adaptor is capable of being fitted into a hole defined in a panel and the first and second spring steel strips are configured to clamp the panel when actuated in an installation position relative to the panel.

6. The adaptor kit of claim 5 wherein the panel is a ceiling panel.

7. The adaptor kit of claim 6 wherein the ceiling panel is an indoor ceiling panel.

8. An adaptor kit comprising:
a housing including a wall defining a slot extending vertically between top and bottom ends of the slot; and
a spring steel strip adapted to be received in the slot, the spring steel strip including first and second sections separated by a sharp bend, a distal end of the first section adapted to be brought into a first position in the slot, and a distal end of the second section having a catch clip thereon adapted to be brought into a second position in the slot which is higher than the first position, the catch clip including at least two resilient fingers adapted to permit the catch clip to be fitted into the slot when the two fingers are laterally compressed towards each other, and then keep the catch clip moveably connected to the housing and within the slot once the two fingers are released.

9. The adaptor kit of claim 8 further comprising a second spring steel strip, and
wherein the slot, the spring steel strip and the wall are a first slot, a first spring steel strip and a first wall respectively, and the housing further includes a second wall defining a second slot extending vertically between top and bottom ends of the second slot, and the second spring steel strip is adapted to be received in the second slot, the second spring steel strip includes first and second sections separated by a sharp bend, a distal end of the first section of the second spring steel strip being adapted to be brought into a first position in the second slot, and a distal end of the second section of the second spring steel strip having a catch clip thereon adapted to be brought into a second position in the second slot which is higher than the first position in the second slot, and the catch clip of the second spring steel strip including at least two resilient fingers adapted to permit the catch clip of the of the second spring steel strip to be fitted into the second slot when the two fingers of the catch clip of the second spring steel strip are laterally compressed towards each other, and then keep the distal end of the second section of the second spring steel strip connected to the housing once the two fingers of the catch clip of the second spring steel strip are released.

10. The adaptor kit of claim 8 wherein the housing further includes ratchet teeth, and the ratchet teeth are configured to engage the catch clip and fix the distal end of the second section at the second position.

11. The adaptor kit of claim 8 wherein the catch clip includes a stopper configured to limit the extent to which the distal end of the first section can be brought close to the distal end of the second section.

12. The adaptor kit of claim 9 wherein the adaptor is capable of being fitted into a hole defined in a panel and the first and second spring steel strips are configured to clamp the panel when actuated in an installation position relative to the panel.

13. The adaptor kit of claim 12 wherein the panel is a ceiling panel.

14. The adaptor kit of claim 13 wherein the ceiling panel is an indoor ceiling panel.

15. A fixture comprising:
a housing including a wall defining a slot extending vertically between top and bottom ends of the slot;
a spring steel strip adapted to be received in the slot, the spring steel strip including first and second sections, the first section including a surface configured to be pressed against a surface of a panel and the second section being curved in a longitudinal direction along at least a portion of a length of the second section, a distal end of the first section adapted to be brought into a first position in the slot, and a distal end of the second section having a catch clip thereon adapted to be brought into a second position in the slot which is higher than the first position, the catch clip including at least two resilient fingers adapted to permit the catch clip to be fitted into the slot when the two fingers are laterally compressed towards each other, and then keep the catch clip moveably connected to the housing and within the slot once the two fingers are released; and
a camera within a space defined by the housing and retained therein.

16. The fixture of claim 15 wherein the housing further includes ratchet teeth, and the ratchet teeth are configured to engage the catch clip and fix the distal end of the second section at the second position.

17. The fixture of claim 15 wherein the catch clip includes a stopper configured to limit the extent to which the distal end of the first section can be brought close to the distal end of the second section.

* * * * *